United States Patent [19]

Stoller

[11] 3,956,783

[45] May 18, 1976

[54] MATTRESS

[75] Inventor: Frederick L. Stoller, Greenville, S.C.

[73] Assignee: Phillips Petroleum Company, Bartlesville, Okla.

[22] Filed: Oct. 21, 1974

[21] Appl. No.: 516,477

[52] U.S. Cl. .................................. 5/345 R; 5/355; 428/175; 428/300
[51] Int. Cl.² ..................... B32B 5/06; A47C 27/08
[58] Field of Search ............. 5/345 R, 355; 161/67, 161/80, 81, 154, 164

[56] References Cited
UNITED STATES PATENTS

| | | |
|---|---|---|
| 2,385,870 | 10/1945 | Lashar et al. ........................ 5/355 |
| 3,321,356 | 5/1967 | Merriman et al. ..................... 161/81 |
| 3,394,043 | 7/1968 | Parlin et al. ......................... 161/154 |
| 3,819,465 | 6/1974 | Parsons et al. ........................ 161/80 |

Primary Examiner—Casmir A. Nunberg

[57] ABSTRACT

A mattress is formed of a core element and a covering. The covering comprises a nonwoven fabric which is formed by needle punching batts of thermoplastic staple. One side of the needle punched batt is heated to fuse the surface.

3 Claims, 3 Drawing Figures

MATTRESS

Mattresses are normally manufactured by applying a suitable ticking or cover material to a resilient core element. The core element can be formed from a variety of materials such as cotton or hair pads, springs, foamed elastomeric materials and combinations of these materials. The covering is normally formed of a fabric such as cotton ticking. Unfortunately, mattresses are subject to soiling, and it is very difficult to clean the covering while it is on the core element.

In accordance with this invention, an improved mattress is provided wherein the covering comprises a nonwoven fabric which is formed by needle punching batts of thermoplastic staple material. One surface of the covering is heated to fuse the surface to provide additional strength. The thermoplastic staple can comprise polypropylene or other synthetic fibers which resist soiling and do not absorb moisture. The use of such a material provides an improved mattress which is constructed of relatively low cost cover material.

Figure 1:
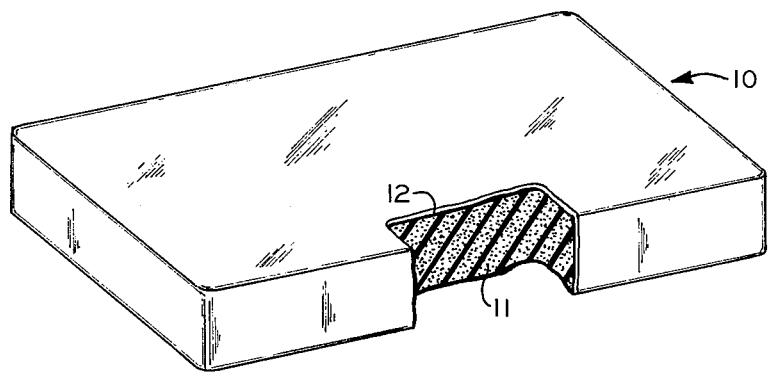
FIG. 1 illustrates a mattress constructed in accordance with this invention.

Referring now to the drawing in detail and to FIG. 1 in particular, there is shown a mattress 10 which comprises a core element 11 having a covering 12 thereto. In the illustrated embodiment, core element 11 is shown as comprising a foamed elastomeric material such as foamed rubber or foamed polyurethane. However, the invention is not limited to mattresses constructed of such materials, but can include other known core elements such as are formed from pads and springs, for example. At the present time, a layer of polyurethane form or a solid polyurethane pad is placed immediately under the ticking in many mattresses. The covering material 12 can be applied by means of sewn seams, as illustrated. If the core is formed of pads, the mattress can be stitched to provide a more stable assembly.

Figure 2:
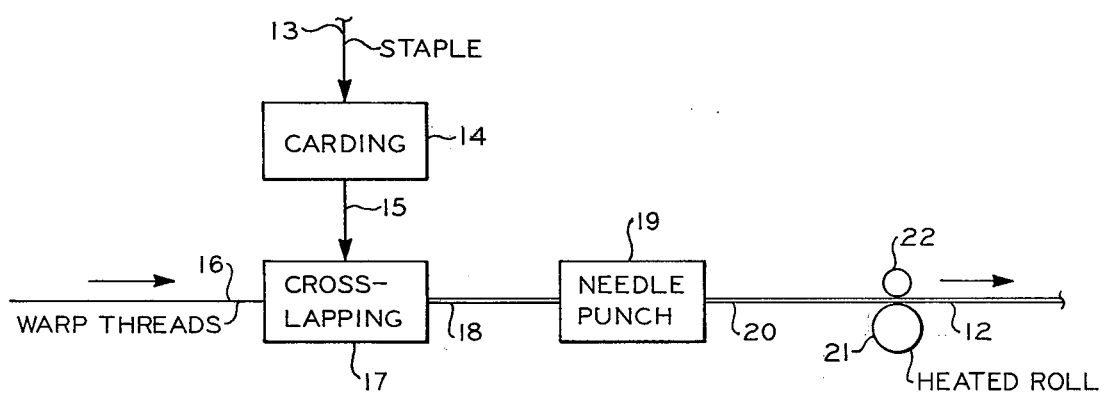
FIG. 2 is a schematic representation of apparatus which can be employed to manufacture the material employed as the cover of the mattress of FIG. 1.

The covering 12 is a nonwoven fabric which can be produced by the apparatus which is illustrated schematically in FIG. 2. A series of parallel warp threads 16, which can be formed of polyester or the like, form a support element. One or more batts of thermoplastic staple 15 are deposited on these threads by conventional carding and crosslapping elements 14 and 17. Thermoplastic staple, such as polypropylene staple 13, is supplied to the carding unit 14. Batts of carded staple 15 are laid down on warp threads 16 by crosslapping machinery 17. The resulting composite 18 is directed to a needle punch 19 which serves to entangle the staple to form a felt 20. This felt is passed between rolls 21 and 22, the former being heated to a temperature sufficiently high to fuse the lower surface of the needle punched material. This results in the production of a nonwoven fabric 12 which forms the cover of the mattress of FIG. 1.

Apparatus of the general type illustrated in FIG. 2 is known in the art for producing nonwoven fabrics. Such apparatus is described in detail in U.S. Pat. No. 3,394,043, for example, the disclosure of which is herein incorporated by reference.

In one specific method of producing fabric 12, staple 13 can comprise 3 denier polypropylene filaments approximately 4 inches long. If desired, small amounts, 10% for example, of staple of different denier, such as 18 denier, 2-½ inches long, for example, can be added to give a visual heather effect. The warp threads can be spun polyester yarn spaced approximately ¼ inch apart. The line speed can be about 22 feet per minute, and the needle punch can impart approximately 450 punches per square inch. The penetration of the needles advantageously is only sufficiently great to lock in the warp yarns. When polypropylene is employed as the staple, fusion temperatures of heated roll 21 can be in the range of 285 to 350° F. Sufficient heat is thus imparted to fuse the lower surface of the material while leaving the upper surface unfused so as to give a low nap "suede" appearance. In the illustrated embodiment, the needles move downwardly through the staple batts which rest on the warp threads. It is desirable that the lower side of the needle punched material be the side that is fused.

Figure 3:
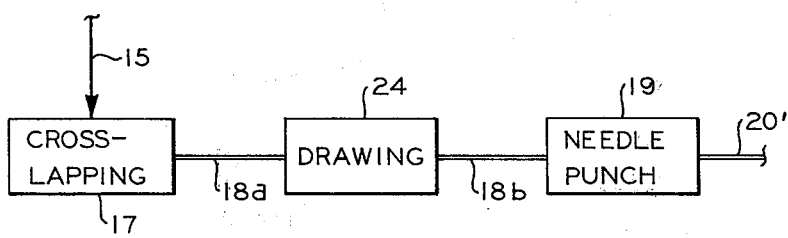
FIG. 3 is a schematic representation of a second embodiment of apparatus which can be employed to manufacture the mattress covering material.

In another method of manufacturing the mattress covering material of this invention, the warp threads 16 are eliminated. Apparatus which can be employed in this manner is illustrated in FIG. 3. Crosslapped batts of staple 18a are passed through a series of drawing rolls 24 to produce an elongated batt 18b which is passed to needle punch 19. The needle punched material 20' is then passed to a heated roll, not shown, corresponding to roll 21 of FIG. 2. In a specific example of the operation of FIG. 3, a line speed of about 34 feet per minute can be employed with a web draw ratio of about 1.9 being utilized. In general, a maximum draw ratio of about 2.5 is employed. The drawing imparted by element 24 tends to strengthen the material in the longitudinal direction so that the warp threads are not required.

It is desirable to employ staple formed of synthetic thermoplastic materials such as olefin polymers, particularly polypropylene, in order to provide a mattress covering having desired properties. These properties include resistance to soiling and mildew, and the formation of a generally nonallergic covering. However, other thermoplastics such as nylon, acrylics, modacrylics, and polyester can be utilized, and can be employed alone or mixed to form blends. Blends are often desirable to reduce flammability if polypropylene is the primary staple employed. The temperature of roll 21 will depend on the melting point of the material employed to form the staple. In any event, sufficient heat is utilized to fuse only the lower surface of the needle punched batt. In place of roll 21, other heaters, such as infrared heaters, can be employed. Infrared heaters are particularly useful if the staple is formed of a synthetic material which has a sharp melting point. The covering generally varies in weight from about 2 to 6 ounces per square yard, with a weight of about 2-½ to 5 ounces per square yard being preferred.

In some applications, it is desirable to form the mattress covering so that the unfused surface of the fabric is on the outside to provide an outer low nap "suede" appearance. In other applications it is desirable to print a pattern on the covering. In this case, the printing is usually applied to the fused surface which is then placed on the outside.

While this invention has been described in conjunction with presently preferred embodiments, it should be evident that it is not limited thereto.

What is claimed is:

1. A mattress comprising a core element and a covering, said covering having a weight of about 2 to 6 ounces per square yard and comprising a nonwoven fabric formed by needle punching a batt of a plurality of crosslapped layers of polypropylene staple deposited on a plurality of spaced polyester warp threads, said needle punching being accomplished by forcing a plurality of needles into the side of the batt opposite the side deposited on the warp threads, and heating the side of the resulting needle punched material opposite the side that the needles entered in order to fuse the surface thereof.

2. The mattress of claim 1 wherein the side of the material that is heated constitutes the inner surface of the covering on said core element.

3. The mattress of claim 1 wherein the side of the material that is heated is printed and constitutes the outer surface of the covering on said core element.

* * * * *